US007529428B2

(12) United States Patent
Yamada et al.

(10) Patent No.: US 7,529,428 B2
(45) Date of Patent: *May 5, 2009

(54) IMAGE PROCESSING APPARATUS AND STORAGE MEDIUM STORING IMAGE PROCESSING PROGRAM

(75) Inventors: Yoichi Yamada, Kyoto (JP); Soichi Nakajima, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 681 days.

This patent is subject to a terminal disclaimer.

(21) Appl. No.: 10/944,009

(22) Filed: Sep. 20, 2004

(65) Prior Publication Data
US 2005/0078125 A1    Apr. 14, 2005

(30) Foreign Application Priority Data
Sep. 25, 2003 (JP) .............................. 2003-333752

(51) Int. Cl.
G06K 9/36 (2006.01)
G09G 5/00 (2006.01)
H04N 5/225 (2006.01)

(52) U.S. Cl. ..................... 382/284; 345/629; 348/220.1

(58) Field of Classification Search ................. 382/190, 382/284, 294, 305, 312, 118; 345/646, 629; 463/31, 43; 434/377; 348/220.1, 222.1; 358/537, 540
See application file for complete search history.

(56) References Cited

U.S. PATENT DOCUMENTS

| 4,122,470 | A | 10/1978 | Loranger et al. |
| 5,621,869 | A | 4/1997 | Drews |
| 5,680,197 | A | 10/1997 | Henrix |
| 5,687,306 | A | 11/1997 | Blank |
| 6,229,904 | B1 | 5/2001 | Huang et al. |
| 6,285,381 | B1 | 9/2001 | Sawano et al. |

(Continued)

FOREIGN PATENT DOCUMENTS

JP    2-106734    4/1990

(Continued)

OTHER PUBLICATIONS

Office Action issued Nov. 18, 2008 in corresponding Japanese Application No. 2003-333752.

(Continued)

*Primary Examiner*—Kanji Patel
(74) *Attorney, Agent, or Firm*—Nixon & Vanderhye P.C.

(57) ABSTRACT

An image processing apparatus includes a CPU and an imaging unit. In this image processing apparatus, an image captured by the imaging unit is displayed on an LCD together with an imaging index, indicative of a predetermined region of a face. In response to a shutter operation by an operator, a portion, matching with a position of the imaging index, is extracted from the image data as a region image. Furthermore, in response to a shutter operation, another image captured by the imaging unit is stored as a still image. Then the region image and the still image are composed with each other to display a composite image, obtained by pasting the image of the predetermined region of the face on to another image. In addition, with respect to the composite image, the region image is deformed according to a feature of the data from the imaging unit, an elapsed time without an operation input, and so on.

14 Claims, 8 Drawing Sheets

U.S. PATENT DOCUMENTS

| | | |
|---|---|---|
| 6,633,655 B1 * | 10/2003 | Hong et al. .................. 382/118 |
| 6,676,517 B2 * | 1/2004 | Beavers ....................... 463/25 |
| 6,677,967 B2 | 1/2004 | Sawano et al. |
| 6,720,997 B1 | 4/2004 | Horie et al. |
| 6,731,302 B1 | 5/2004 | Cote |
| 6,852,033 B2 * | 2/2005 | Kinjo et al. ................... 463/30 |
| 7,010,152 B2 | 3/2006 | Bojer et al. |
| 2001/0055028 A1 | 12/2001 | Oka |
| 2002/0171746 A1 | 11/2002 | Stephany et al. |
| 2003/0002730 A1 | 1/2003 | Petrich |
| 2003/0234871 A1 * | 12/2003 | Squilla et al. ............ 348/220.1 |
| 2005/0074739 A1 * | 4/2005 | Shapiro ...................... 434/377 |
| 2005/0129324 A1 | 6/2005 | Lemke |

FOREIGN PATENT DOCUMENTS

| | | |
|---|---|---|
| JP | 03-215891 | 9/1991 |
| JP | 06-189255 | 7/1994 |
| JP | 08-293038 | 11/1996 |
| JP | 09-282440 | 10/1997 |
| JP | 10-240962 | 9/1998 |
| JP | 11-306366 | 11/1999 |
| JP | 2000-030040 | 1/2000 |
| JP | 2000-092306 | 3/2000 |
| JP | 2001-067459 | 3/2001 |
| JP | 2001-177799 | 6/2001 |
| JP | 2002-207244 | 7/2002 |
| JP | 2003-099779 | 4/2003 |
| JP | 2003-248842 | 9/2003 |

OTHER PUBLICATIONS

Office Action issued Feb. 17, 2009 in corresponding Japanese Application No. 2003-333752.

* cited by examiner

FIG. 3

PROGRAM STORING AREA 62
- MAIN PROGRAM — 66
- IMAGING INDEX DISPLAYING PROGRAM — 68
- REAL TIME IMAGING PROGRAM — 70
- STILL IMAGE PHOTOGRAPHING PROGRAM — 72
- REGION IMAGE EXTRACTING PROGRAM — 74
- PHOTOGRAPHED IMAGE COMPOSING/DISPLAYING PROGRAM — 76
- PHOTOGRAPHED IMAGE FEATURE EXTRACTING PROGRAM — 78
- STILL IMAGE DEFORMING CONDITION COMPARING PROGRAM — 80
- ELAPSED TIME COUNTING PROGRAM — 82
- STILL IMAGE DEFORMING PROGRAM — 84
  - TEARFUL FACE CHANGING PROGRAM — 84a
  - SMILING FACE CHANGING PROGRAM — 84b
  - SLEEPY FACE CHANGING PROGRAM — 84c
  - ⋮

DATA STORING AREA 64
- IMAGING DATA BUFFER AREA — 86
- STILL IMAGE DEFORMING TABLE — 88
  - TEARFUL FACE CHANGING PROGRAM SELECTING DATA — 88a
  - SMILING FACE CHANGING PROGRAM SELECTING DATA — 88b
  - SLEEPY FACE CHANGING PROGRAM SELECTING DATA — 88c
  - ⋮
- STILL IMAGE DATA — 90
- STILL IMAGE COPY DATA — 92
- EXTRACTED IMAGE DATA — 94
  - RIGHT EYE REGION IMAGE DATA — 94a
  - LEFT EYE REGION IMAGE DATA — 94b
  - MOUTH REGION IMAGE DATA — 94c
  - ⋮
- SOUND DATA — 96
  - ⋮

60

FIG. 6
(A) STANDARD LUMINANCE
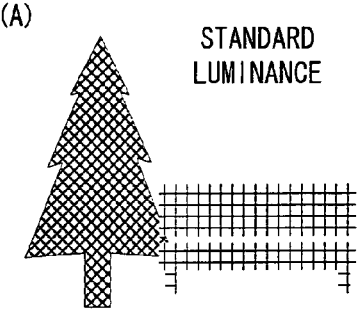
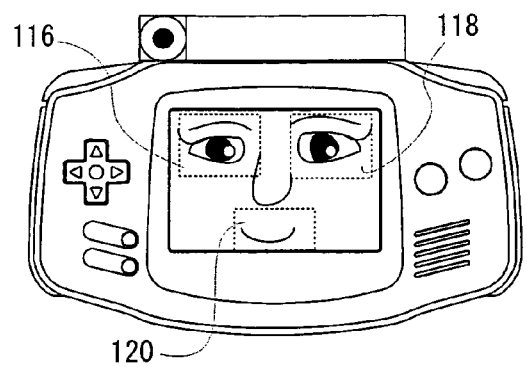
(B) LOW LUMINANCE
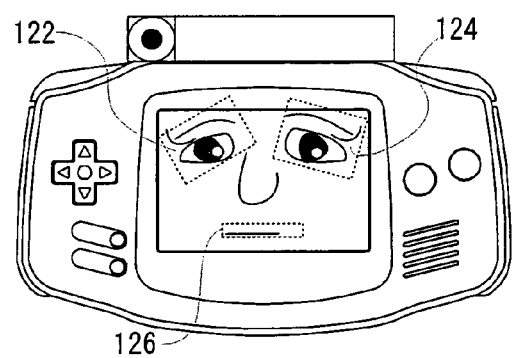
(C) HIGH LUMINANCE
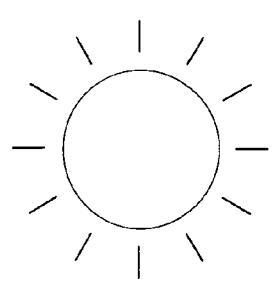
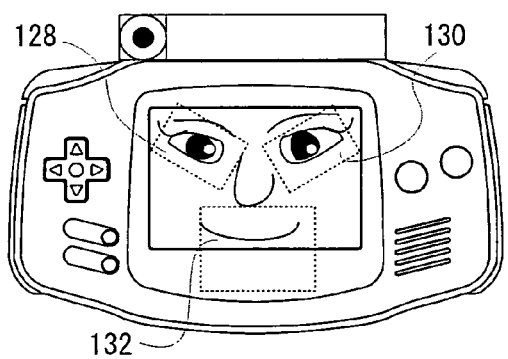
(D)
PREDETERMINED TIME PERIOD ELAPSES WITHOUT ANY OPERATION
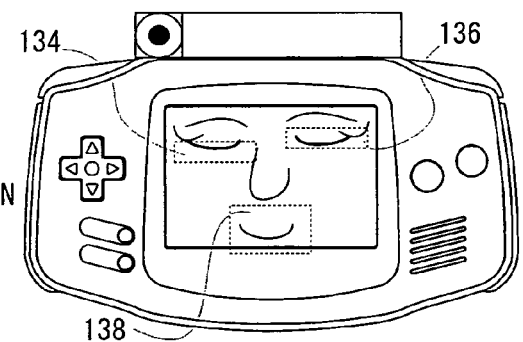

IMAGE PROCESSING APPARATUS AND STORAGE MEDIUM STORING IMAGE PROCESSING PROGRAM

This application claims priority to JP Application No. 2003-333752, filed Sep. 25, 2003. The entire contents of this application is incorporated herein by reference.

BACKGROUND AND SUMMARY OF THE INVENTION

1. Field of the Invention

The illustrative embodiments relate to an image processing apparatus and a storage medium storing an image processing program. More specifically, the illustrative embodiments relate to an image processing apparatus and a storage medium storing an image processing program in an apparatus including a photographing and displaying function such as an electronic camera that photographs a face of a certain object, further photographs a face of another object and then displays one image and another image in a composited manner.

2. Description of the Prior Art

Digital cameras generally utilized at present are provided with a photographing portion for photographing an object, an operating portion including a shutter button, and a display portion for displaying a resultant image obtained by photographing the object. An operator aims the photographing portion toward the object, and takes a picture by operating the operating portion while viewing an image displayed in real time on the display portion or a finder, then the operator confirms the result of the photographing. For example, in an electronic camera disclosed in a Japanese Patent No. 2555848, the above-described construction is disclosed, and a technique for electronically realizing an effect similar to multiple exposure photographing with a camera utilizing a film is further disclosed.

The photograph image data can be captured by a personal computer, and then processed by photo-retouching software, for example. Software that allows such processing, such as "Adobe® Photoshop®" manufactured by Adobe Systems, Inc., and the like, is well known.

In conventional and general electronic cameras, including the electronic camera of the prior art, a photographed image is displayed on the display portion of the camera, in the state that it was photographed in, and therefore the operator simply views the individual electronic photos as photographed.

In order to process the photograph, after photographing the objects, the image data has to be captured by a PC or the like, and processed through the use of the photo-retouching software. For example, in a composing process, the position and the size of areas to be used for the composition have to be designated one-by-one to cut them out, and so forth, by operating an input device such as a mouse, such process being a tedious and unenjoyable one. Furthermore, in the prior art, the processing is performed after the PC captures the image data, and therefore the photographing and the process are separated in terms of time and space. Thus, the interest in the photograph and the appreciation thereof could wane due to the time separation.

Therefore, it is a feature of an illustrative embodiment to provide a novel image processing apparatus and a storage medium storing an image processing program.

Another feature of an illustrative embodiment is to provide an image processing apparatus and a storage medium storing an image processing program capable of adding increased amusement at the time of taking the picture and allowing the user to enjoy forming a composite image readily and easily without engaging in a difficult process.

An image processing apparatus according to an illustrative embodiment is an image processing apparatus comprising an imager, an image display, an imaging guide displaying mechanism, an operating mechanism, an extracting mechanism, a still image storing locations, a composing mechanism, and a composite image display. An imager electronically photographs an object. An image display displays the object photographed by an imager. The imaging guide displaying mechanism displays an imaging guide, on an image display, indicative of a position of a predetermined region of a face. The operating mechanism inputs data in response to an operation by an operator, or obtains an operation input. The extracting mechanism extracts a portion, matching with a display position of the imaging guide, from one image obtained by an imager, in response to the operation input from the operating mechanism, and stores it as a region image. The still image storing locations stores another image obtained by an imager as a still image in response to the operation input from the operating mechanism. The composing mechanism composes the region image stored by the extracting mechanism and the still image stored by the still image storing locations. The composite image display displays a composite image on an image display, composed by the composing mechanism.

More specifically, the image processing apparatus (10: a reference numeral corresponding in the preferred embodiment described later. The same is applied to the following.) includes an imager (30) for electronically photographing the object, and the object (104, 112) photographed by an imager is displayed on an image display (18). Furthermore, on an image display, the imaging guides (102a, 102b, 102c) indicative of the positions of the predetermined regions of the face are displayed by the imaging guide displaying mechanism (32, 68). Upon photographing, the position of the guides is adjusted such that the predetermined region of the face displayed by an image display and the imaging guide match with each other, whereby it is possible to easily obtain the region image indicative of the predetermined region of the face to form a desired composite image. The operating mechanism (20) inputs the data (operation input) in response to the operation by the operator (100), or obtains the operation input, and the operator operates the operating mechanism, for example, performs a shutter operation to take a picture. The extracting mechanism (32, 74, 94, S5, S7) extracts the portion of the image matching with the display position of the imaging guide from one image obtained by an imaging imager in response to the operation input from the operating mechanism, and stores it as a region image (106, 108, 110). The still image storing locations (32, 72, 90, S15, S17) stores another image obtained by an imager as a still image (114) in response to the operation input from the operating mechanism. The composing mechanism (32, 76, S21) composes the region image stored by the extracting mechanism and the still image stored by the still image storing locations. Then, the composite image displaying means (32, 76, S23) displays the composite image composed by the composing mechanism on an image display. Thus, according to the image processing apparatus, merely photographing one image after another makes it possible to easily create and display an interesting composite image obtained by composing the region image extracted from one image and another image.

In one aspect, the image processing apparatus further comprises a first evaluating mechanism and a first deforming mechanism. The first evaluating mechanism extracts feature data indicative of a feature of the relevant image, from the image data obtained by an imager, and evaluates the feature data. The first deforming mechanism deforms the region image according to a result of the evaluation by the first evaluating mechanism. Then the composing mechanism, after the region image has been deformed by the first deforming mechanism, composes the deformed region image and the still image.

More specifically, the first evaluating mechanism (32, 78, 80, S53, S55, S57) extracts the feature data, indicative of the feature of the relevant image, from the image data obtained by an imager, and evaluates the feature data. In one embodiment, as the feature data, luminance data, or RGB data, or the like is extracted from the optical information of the image data, for example, and the luminance data, or the like, is compared with a predetermined standard value so as to be evaluated. The first deforming mechanism (32, 84a, 84b, S59-S63, S65-S69) deforms the region image according to a result of the evaluation by the first evaluating mechanism. In one embodiment, at least one region image is deformed by a rotation, an enlargement/reduction, or the like. Then, the composing mechanism (S59-S63, S65-S69), after the region image has been deformed by the first deforming mechanism, composes the deformed region image (122-126, 128-132) and the still image. Accordingly, by use of the image data obtained by an imager, the composite image with the region image deformed according to the feature can be formed and displayed.

In another aspect, the image processing apparatus further comprises an elapsed time counter, a second evaluating mechanism, and a second deforming mechanism. The elapsed time counter counts an elapsed time after an operation input from the operating mechanism is present. The second evaluating mechanism evaluates the elapsed time counted by the elapsed time counter. The second deforming mechanism deforms the region image according to a result of the evaluation by the second evaluating mechanism. Then, the composing mechanism composes, after the region image has been deformed by the second deforming mechanism, the deformed region image and the still image.

More specifically, the elapsed time counter (32, 82, S25, S51, S75) counts the elapsed time after the operation input from the operating mechanism is present. The second evaluating mechanism (32, 82, S77) evaluates the elapsed time counted by the elapsed time counter. In one embodiment, it is determined whether or not the counted time exceeds a predetermined threshold value. The second deforming mechanism (32, 84c, S79) deforms the region image according to the result of the evaluation by the second evaluating mechanism. Here, as described above, at least one region image is subjected to a deformation such as rotation, enlargement/reduction, or the like, for example. Then, the composing mechanism (S79) composes, after the region image has been deformed by the second deforming mechanism, the deformed region image (134-138) and the still image. Thus, the composite image, with the region image deformed according to an elapsed time, can be formed and displayed without obtaining operation input from the operating mechanism.

A storage medium storing an image processing program according to the illustrative embodiments is a storage medium for storing an image processing program, for composing and displaying the photographed image in an image processing apparatus, provided with an imager for electronically photographing an object, an image display for displaying the object photographed by an imager, and an operating mechanism for inputting data in response to an operation by an operator or obtaining an operation input. The image processing program stored in the storage medium causes a processor of the image processing apparatus to execute an imaging guide displaying step, an extracting step, a still image storing step, a composing step, and a composite image displaying step. The imaging guide displaying step displays an imaging guide indicative of a position of a predetermined region of a face on an image display. The extracting step extracts a portion matching with a display position of the imaging guide from one image obtained by an imager, in response to the operation input from the operating mechanism, and stores it as a region image. The still image storing step stores as a still image another image obtained by an imager, in response to the operation input from the operating mechanism. The composing step composes the region image stored by the extracting step and the still image stored by the still image storing step. The composite image displaying step displays a composite image on an image display, composed by the composing mechanism. Also in the storage medium storing the image processing program, an interesting composite image can be easily formed and displayed, similar to in the above-described image processing apparatus.

In one aspect, the image processing program stored in the storage medium further includes a first evaluating step and a first deforming step. The first evaluating step extracts feature data indicative of a feature of relevant image from the image data obtained by an imager, and evaluates the feature data. The first deforming step deforms the region image according to a result of the evaluation by the first evaluating mechanism. Then, the composing step, after the region image has been deformed by the first deforming mechanism, composes the deformed region image and the still image. Also, in the storage medium storing the image processing program, a composite image, with the region image deformed according to the feature of the imaging data, from an imager, can be formed and displayed, similar to in the above-described image processing apparatus.

In another aspect, the image processing program stored in the storage medium further includes an elapsed time counting step, a second evaluating step, and a second deforming step. The elapsed time counting step counts an time elapsed after the operation input from the operating mechanism is present. The second evaluating step evaluates the elapsed time counted by the elapsed time counting step. The second deforming step deforms the region image according to a result of the evaluation by the second evaluating step. Then the composing step, after the region image has been deformed by the second deforming step, composes the deformed region image and the still image. Also, in the storage medium storing the image processing program, a composite image, with the region image deformed according to the elapsed time after the operation input, can be formed and displayed similar to in the above-described image processing apparatus.

An image processing apparatus according to the illustrative embodiments is an image processing apparatus comprising an imager, an image display, an imaging guide displaying mechanism, an operating mechanism, an extracting mechanism, a still image storing locations, a composing mechanism, a composite image displaying mechanism, an evaluating mechanism, and a deforming mechanism. An imager electronically photographs an object. An image display displays the object photographed by an imager. The imaging guide displaying mechanism displays, on an image display, imaging guides representative of positions of regions of a face, such that they surround at least both of the eyes and the mouth of the face. The operating mechanism is for performing an input operation by an operator. The extracting mechanism extracts the images from the regions of at least both of the eyes and the mouth, surrounded by the imaging guides from a first image, first obtained in response to the operating mechanism, and stores them as region images. The still image storing locations stores, as a still image, a second image obtained successive to the first image, in response to the operating mechanism. The composing mechanism composes the region image stored by the extracting mechanism and the still image stored by the still image storing locations. The composite image displaying mechanism displays, on the display, a composite image composed by the composing mechanism. The evaluating mechanism extracts feature data of the photographed image, from optical information of the photographed image obtained by an imager, and evaluates the feature data. The deforming mechanism deforms the region image according to the evaluating mechanism. Then the composing mechanism, after the region image has been deformed according to the deforming mechanism, composes the deformed region image and the still image, and displays it on image display.

More specifically, although the image processing apparatus is approximately the same as the above-described one aspect of the image processing apparatus, the imaging guides indicate positions of the regions of the face such that they surround at least the both eyes and the mouth of the face. When the operator adjusts, such that the imaging guides match with the both eyes and the mouth of the object, and takes a picture, the extracting mechanism extracts the region images of at least both eyes and the mouth, surrounded by the imaging guides first obtained from the first image. Then the region image and the second image obtained successive to the first image are composed with each other by the composing mechanism so as to be displayed on an image display. With respect to the composite image, according to the evaluation of the feature data, extracted from the optical information (color information, luminance information, or the like) of the photographed image obtained by an imager, the regions images of at least both of the eyes and the mouth are deformed, and the composite image, with the region images deformed, is displayed on an image display. Accordingly, in the image processing apparatus, similar to in the above described image processing apparatus, when the operator takes pictures one after another, the composite image obtained by composing the region images extracted from the first image and the second image can be easily formed, providing the user with a highly interesting composite image whose region images are deformed according to the feature data.

According to the illustrative embodiments, when the operator takes pictures one after another, the composite image can be easily formed and displayed immediately from the photographed image. Accordingly, it is possible to add increased interest at the time of taking a picture and create a more enjoyable photography experience than it is in conventionally merely photographing an object and displaying an individual still image. In addition, there is no need to capture the images in the PC and perform a troublesome composing process, the illustrative embodiments allow a user to enjoy forming an interesting composite image readily and easily.

Displaying the composite image with the region image deformed, according to the feature data extracted form the optical information (color information or luminance information, or the like) of the photographed image data, makes it possible to enjoy forming the composite image.

In addition, displaying the composite image, with the region image deformed according to the time elapsed since the last operation input, makes it possible to enjoy forming a more interesting composite image.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing one example of a memory map of a WRAM in FIG. 2;

FIG. 6 is an illustrative view showing one example of a condition of deformation and a deformed manner of a composite image, FIG. 6(A) shows a deformation in a case that a luminance is normal, FIG. 6(B) shows a deformation in a case that a luminance is low, FIG. 6(C) shows a deformation in a case that a luminance is high, and FIG. 6(D) shows a deformation in a case that a predetermined time elapses without any operation;

DETAILED DESCRIPTION OF THE PREFERRED EMBODIMENTS

Figure 1:
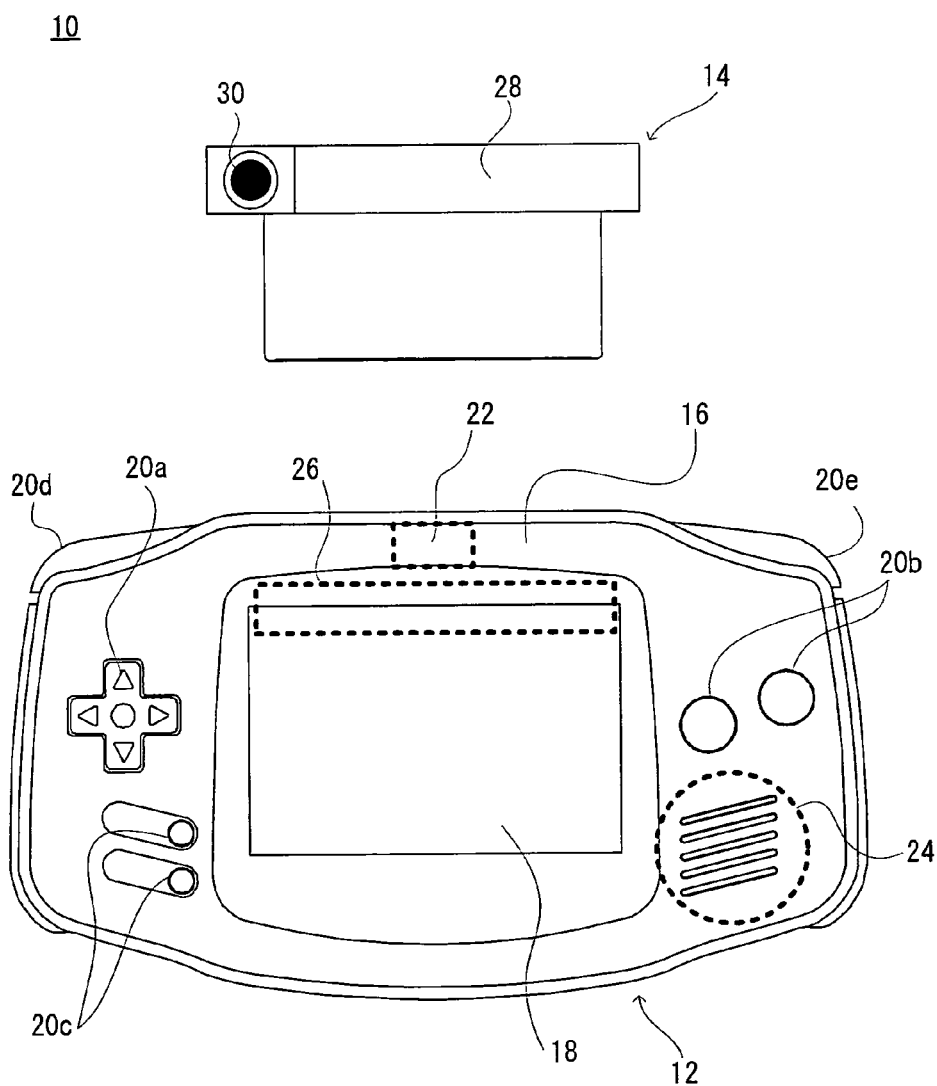
FIG. 1 is an appearance view showing an image processing apparatus of one embodiment of the present invention.

An image processing apparatus 10 of one embodiment shown in FIG. 1 photographs at least two images, including an image of face, in order to compose these images, and is embodied as a form of a game apparatus as an example. The game apparatus 10 includes a game machine 12 and a camera cartridge 14 to be attached to the game machine 12.

The game machine 12 is also capable of being hand-held, with both hands, and various games are enjoyable by changing a cartridge as a detachable external storage medium storing a game program and data. The camera cartridge 14 provided with an electronic imaging function is utilized in this embodiment as a cartridge. The game machine 12 includes a housing 16, in the form of horizontally-long rectangular shape, for example, and on one surface (front surface) of the housing 16, a liquid crystal display (hereinafter, referred to as "LCD") 18 is provided at the approximate center thereof as one example of an image display means, and a variety of operating switches 20 are provided at the right and the left of the LCD 18 as an operating means.

The operating switches 20 include, for example, a direction switch 20a, action switches 20b, start/select buttons 20c, an L button 20d provided at the left corner of the housing 16, and an R button 20e provided at the right corner of the housing 16. The direction switch 20a is utilized for instructing, when operating a character (not shown) during a game, for example, a movement direction of the character, and for moving a cursor to select items. The action switches 20b are utilized for instructing an action (for example, jumping, and etc.) of the character, and determining/canceling an option to be selected. The L button 20d is utilized as a shutter button, and etc. at a time of photographing with a camera. The R button 20e is utilized for another photographing operation (canceling the photographing, and etc.). The start/select buttons 20c are utilized for starting a game playing or interrupting a game operation. Content of the game to be processed by the game apparatus 10 and image data photographed by the camera are displayed on the LCD 18, and an operator enjoys the game image and the image photographed by the camera, displayed on the LCD 18 by operating the various operating switches 20 described above.

Figure 2:
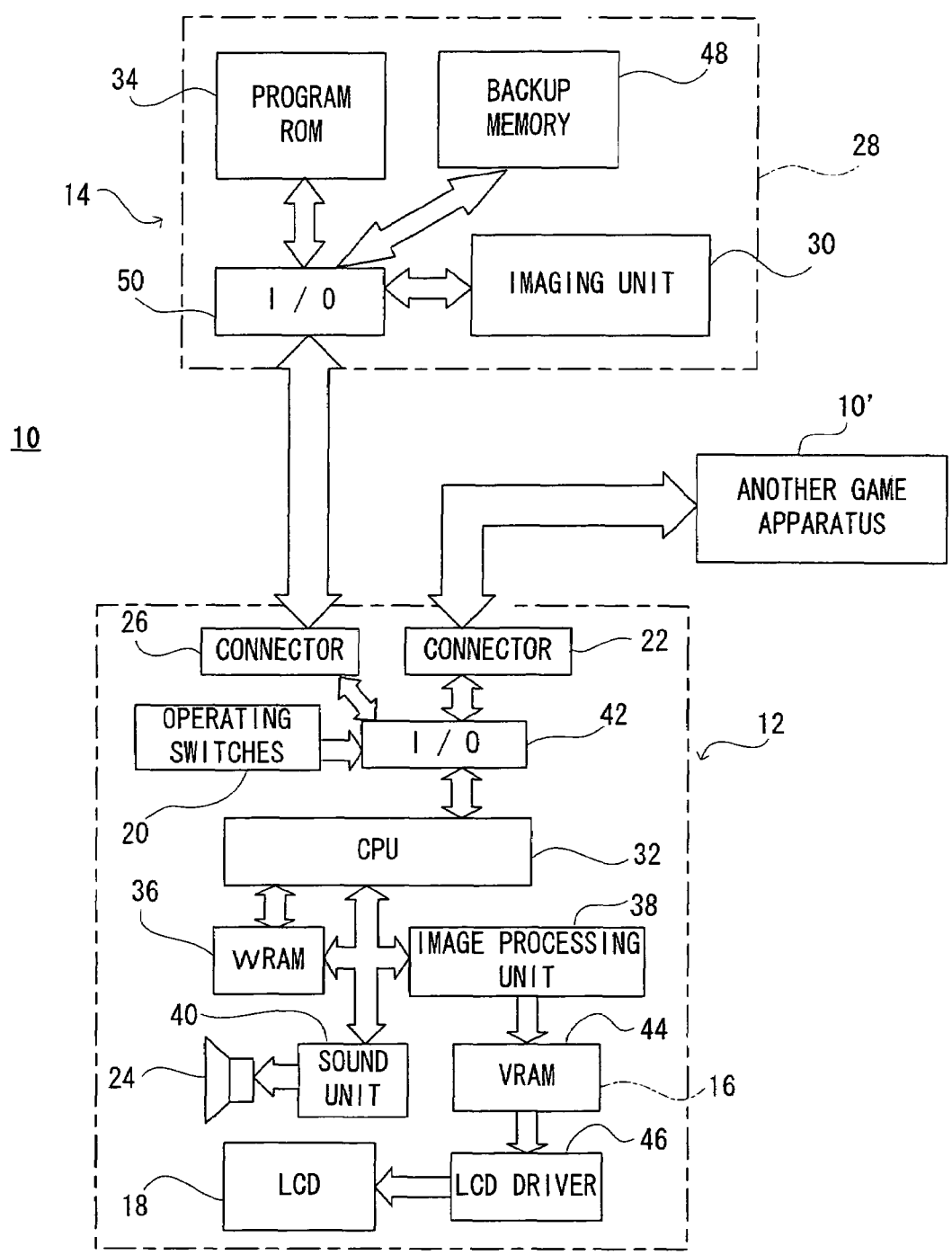
FIG. 2 is a block diagram showing one example of an internal configuration of the image processing apparatus of FIG. 1 embodiment.

Furthermore, the game machine 12 is provided with a connector 22 at a top surface thereof as necessary. The connector 22 is utilized in playing a communication game by being connected with another game apparatus 10' (or another game machine 12'), and for transmitting and receiving data stored with the content of the game processed by the game machine 12, the data photographed by the camera, and etc., as shown in FIG. 2. In addition, a speaker 24 is provided inside sound-bleeding holes provided on the surface of the housing 16, and BGM and sound effects are output therefrom during the game.

The camera cartridge 14 includes a housing 28 attachable to and detachable from the game machine 12 via a connector 26 provided on the rear surface of the housing 16, and an imaging unit 30. Then the camera cartridge 14 is inserted into the game machine 12 and connected thereto via the connector 26, this allows the game machine 12 to function as a game apparatus provided with an imaging function.

FIG. 2 shows a block diagram of the game apparatus 10 in a state that the game machine 12 and the camera cartridge 14 are connected with each other. With reference to FIG. 2, the game machine 12 includes a CPU 32. The CPU 32 is called a processor or a computer and performs game processing, photographing processing, and etc., according to a program of the program ROM 34 included in the camera cartridge 14. The CPU 32 is connected with a working RAM (hereinafter, referred to as "WRAM") 36, an image processing unit 38, a sound unit 40, and an input/output interface (hereinafter, referred to as "I/O") 42.

The WRAM 36 is utilized as a work area or a buffer area for the CPU 32. The CPU 32 loads data required at a time of the game processing, and updates and stores the data generated during the game processing in the WRAM 36. The image processing unit 38 is connected with a video RAM (hereinafter, referred to as "VRAM") 44. The image processing unit 38 generates, according to an instruction of the CPU 32, image data for display on the basis of the data temporarily stored in the WRAM 36. The VRAM 44 temporarily stores the image data for display generated by the image processing unit 38. The image data stored in the VRAM 44 is displayed on the LCD 18 via an LCD driver 46. To output a music or a sound effect from the speaker 24, a sound unit 40 converts sound data generated in association with a game process of the CPU 32 into an analog signal.

The I/O 42 connects the CPU 32 with the operating switches 20, the connector 26 (camera cartridge 14), and the connector 22 (another game apparatus 10'). The CPU 32 receives data from the operating switches 20 via the I/O 42 so as to use it in the program processing. Furthermore, the CPU 32 controls the camera cartridge 14 via the I/O 42. In addition, the CPU 32 sends and receives data with another game apparatus 10' via the connector 22 connected to the I/O 42.

The camera cartridge 14 is provided with the imaging unit 30, a program ROM 34, and a backup memory 48 inside the housing 28 that are connected to a cartridge input/output interface (hereinafter, referred to as "cartridge I/O") 50. The imaging unit 30 includes an electronic photosensitive element as an imaging device, such as a CMOS sensor, a CCD or the like, and outputs optical information (color information, luminance information, or the like) obtained by light exposure as digital data. The program ROM 34 stores a program and data for causing the game apparatus 10 to act as an image processing apparatus. A backup memory 48 is a writable/readable memory for storing progress of the game, image data photographed by the imaging unit 30 and etc., a flash memory, being a non volatile memory or an SRAM using a battery as a power supply are utilized, for example. When the camera cartridge 14 is attached to the game machine 12, the cartridge I/O 50 is connected to the CPU 32 via the connector 26 and the I/O 42. Thus, the CPU 32 is capable of accessing the imaging unit 30, the program ROM 34, and the backup memory 48, via the cartridge I/O 50, to control the camera cartridge 14 or to send and receive the data with the camera cartridge 14.

Although the individual game machine 12 and camera cartridge 14 are (detachably) connected in this embodiment, these may be integrally constructed. That is, the imaging unit 30, the program ROM 34, and the backup memory 48 may be included in the game machine 12.

Thus, by attaching the camera cartridge 14 to the hand-held type game machine 12 integrally provided with the LCD 18, it is possible to display a photographed image on the display screen (LCD 18) immediately and to photograph an object similar to using an electronic camera or a digital camera.

Furthermore, although the above description describes a case in which the game machine 12 is integrally provided with the LCD 18, a similar function can be applied to a fixed-type video game machine connected to a home-use television receiver (CRT). In this case, when the game machine 12 is a fixed-type video game machine, the operating switch 20 may be not integrally formed on the housing 16, but provided on a game machine controller, independent of the video game machine.

FIG. 3 shows one example of a memory map 60 of the WRAM 36 when the game apparatus 10 functions as an image processing apparatus according to the illustrative embodiments. The memory map 60 is roughly divided into a program storing area 62 and a data storing area 64. The program storing area 62 stores various programs that are executed by the CPU 32 which make the game machine 12 function as the image processing apparatus of the illustrative embodiments. The data storing area 64 stores various data to be utilized by the programs stored in the program storing area 62. Also, the data storing area 64 is an area for temporarily storing the data generated through the program processing.

It is noted that the memory map 60 is a memory map of the WRAM 36. However, similar to the game apparatus of this embodiment, if the CPU 32 is capable of directly connecting the ROM 34 which stores a program, there is no need to transfer and store a program and data to the WRAM 36. In this case, a part of the program storing area 62 and the data storing area 64 can be fixedly stored in the ROM 34, and therefore, the CPU 32 can directly access the ROM 34. However, in the case of adopting such a method, it is impossible to write to the ROM 34 and therefore data dedicated for reading is fixedly stored.

The program storing area 62 includes a main program storing area 66, an imaging index displaying program storing area 68, a real-time imaging program storing area 70, a still image photographing program storing area 72, a region image extracting program storing area 74, a photographed image composing/displaying program storing area 76, a photographed image feature extracting program storing area 78, a still image deforming condition comparing program storing area 80, an elapsed time counting program storing area 82, and a still image deforming program storing area 84.

In the main program storing area 66, a main program for performing a general process such as obtaining data (operation input data) in response to an operation of the operating switch 20 by the operator, displaying game characters and photographed images, and so forth, for example, is stored.

Figure 4:
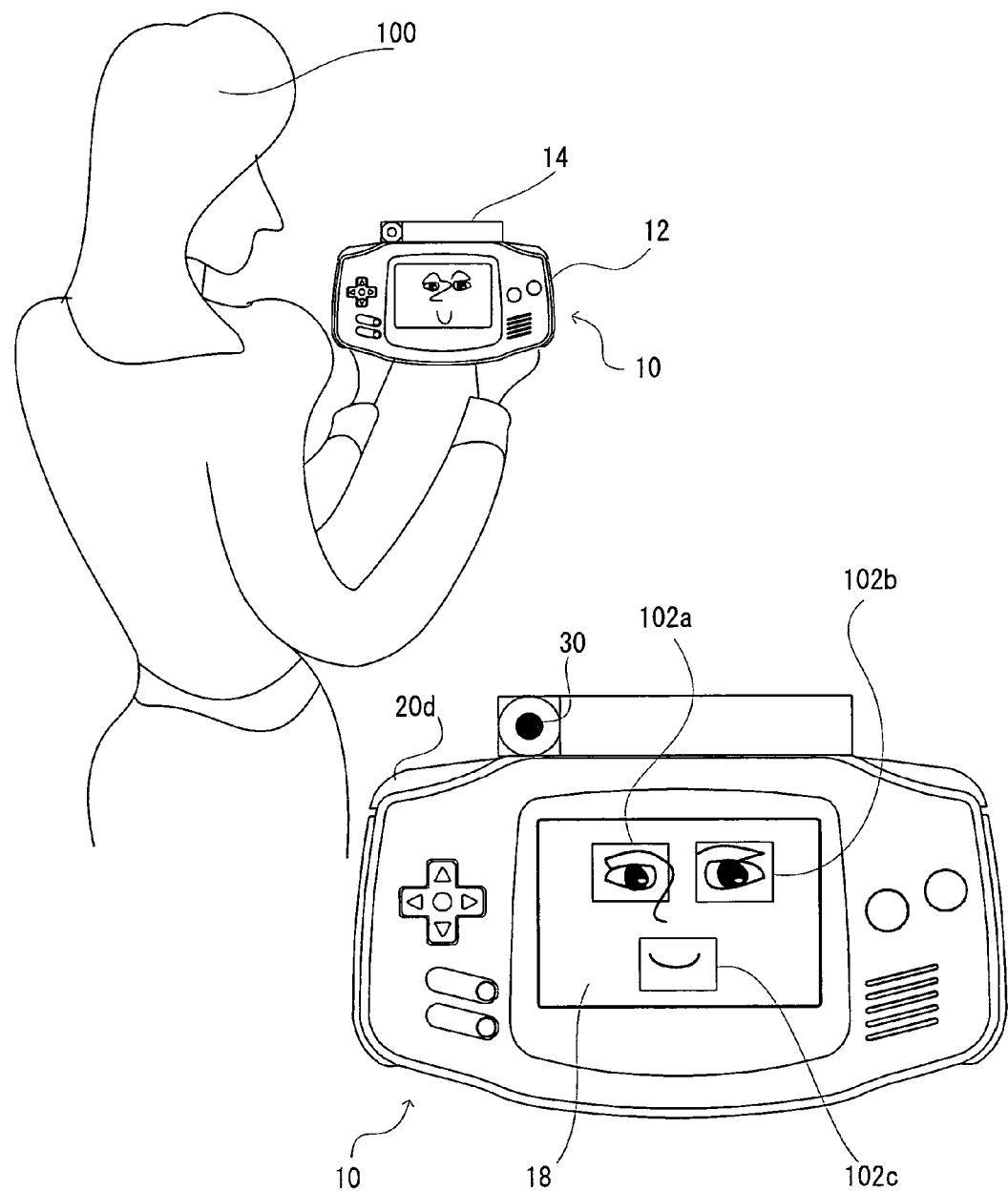
FIG. 4 is an illustrative view showing an outline when taking a picture by use of the image processing apparatus of FIG. 1 embodiment.

In the imaging index displaying program storing area 68, a program for displaying an imaging index (imaging guide) 102 on the LCD 18 is stored. The imaging index 102 is, as shown in FIG. 4, for indicating a position of a predetermined region of a face of an object, and displayed at a predetermined position on the LCD 18. It is appropriate that the operator 100 takes a picture such that the predetermined region of the face of the object matches the imaging index 102. In this embodiment, as shown in FIG. 4, the imaging indexes 102 include a right eye index 102a, a left eye index 102b, and a mouth index 102c indicative of positions of at least both of the eyes and the mouth of the object, for example, and respective indexes 102 have a rectangular shape and have a predetermined size so as to surround both of the eyes and the mouth. Thus, it is appropriate that the operator 100 adjusts an imaging position such that the respective regions of the face fall within the ranges of the indexes 102. If photographing in this manner, the predetermined region of the face (right eye, left eye, and mouth in this embodiment) is included in each region image obtained by extracting a part within each index 102. Thus, it is possible to photograph an optimal image for a composite image, including the predetermined regions of the face, and to easily form a desired composite image.

In the real-time photographing program storing area 70, a program is stored for real time displaying, on the LCD 18, of an image to be photographed by use of the imaging unit 30.

In the still image imaging program storing area 72, a program is stored for capturing image data of an object during photographing and storing it as a still image, in a case of photographing in real time, by use of the imaging unit 30, when the operator 100 performs a shutter operation by depressing the L button 20d, and so forth.

In the region image extracting program storing area 74, a program is stored for extracting the image data of a part matching with a position and storing it as a region image, from the still image data photographed by the still image photographing program, where the imaging index 102 is displayed. In one embodiment, the right eye index 102a, the left eye index 102b, and the mouth index 102c are displayed as the imaging index 102 as described above, and the respective portions matching with the displayed positions of these indexes 102 are stored as right eye region image data, left eye region image data, and mouth region image data.

In the photographed image composing/displaying program storing area 76, a program is stored for generating and for displaying one set of composite image data, formed by composing a region image extracted by the region image extracting program and another image photographed by the still image photographing program.

In the photographed image feature extracting program storing area 78, a program is stored for extracting, in real time, after the still image is photographed to display a composite image, data indicative of a predetermined feature such as a luminance, a color, etc., from photographed data input from the imaging unit 30.

In the still image deforming condition comparing program storing area 80, a program is stored for evaluating the data indicative of the feature of the image extracted by the photographed image feature extracting program. For example, whether or not the feature data is coincident with a predetermined condition, or the relationship between the feature data and a predetermined standard value is compared and evaluated. If a predetermined condition is satisfied, a still image deforming program, corresponding to the condition, is activated to change the composite image.

In the elapsed time counting program storing area 82, a program is stored for counting and evaluating the time elapsed since a predetermined operation input (shutter operation) by the operating switch 20. For example, it is evaluated whether or not the predetermined time to display the composite image without operating any operating switch 20 by the operator 100 (for example, 5 seconds, or 100 counts in the CPU 32) has elapsed after the still image has been photographed. In a case that the predetermined time (threshold value for deformation) elapses without receiving any operating input, the still image deforming program, corresponding to the elapsed time, is activated to change the composite image.

The still image deforming program storing area 84 is an area storing a program for deforming the composite image, and includes a tearful face changing program storing area 84a, a smiling face changing program storing area 84b, a sleepy face changing program storing area 84c, and etc.

The tearful face changing program storing area 84a stores a program for changing the composite image to a tearful face. The program is selected when the still image displays a certain composite image on the LCD 18, and then it is determined by the still image deforming condition comparing program that the feature data extracted from the image data captured by the imaging unit 30 satisfies a condition, a low (dark) luminance, for example.

The smiling face changing program storing area 84b stores a program for changing the composite image to a smiling face. The program is selected when the still image displays a certain composite image on the LCD 18, and then it is determined by the still image deforming condition comparing program that the feature data extracted from the image data captured by the imaging unit 30 satisfies a condition, a high (light) luminance, for example.

The sleepy face changing program storing area 84c stores a program for changing the composite image to a sleepy face. The program is selected when the still image displays a certain composite image on the LCD 18, and then it is determined by the still image deforming condition comparing program that the predetermined time elapses without receiving any operation input by the elapsed time counting program, for example.

The data storing area 64 includes an imaging data buffer area 86, a still image deforming table storing area 88, a still image data storing area 90, a still image copy data storing area 92, an extracted image data storing area 94, a sound data storing area 96, and etc.

The imaging data buffer area 86 is an area for temporarily storing the image data electronically photographed by the imaging unit 30. The CPU 32 and the image processing unit 38 read out the data temporarily stored in this area, and display it on the LCD 18 according to the real time imaging program.

The still image deforming table storing area 88 is an area storing a table for determining which image deforming program is to be selected, and includes a tearful face changing program selecting data storing area 88a, a smiling face changing program selecting data storing area 88b, and a sleepy face changing program selecting data storing area 88c.

The tearful face changing program selecting data storing area 88a is an area, storing data indicative of selecting a tearful face changing program, when the feature data extracted by the photographed image feature extracting program takes a value in a certain range.

The smiling face changing program selecting data storing area 88b is an area storing data indicative of selecting a smiling face changing program, when the feature data extracted by the photographed image feature extracting program takes a value in a certain range. The sleepy face changing program selecting data storing area 88c is an area storing data indicative of selecting a sleepy face changing program, a value counted by the elapsed time counting program exceeds a certain value.

The still image data storing area 90 is an area for temporarily storing image data of the still image, captured by the still image photographing program from the imaging unit 30 and obtained by a shutter operation by the operator 100. Furthermore, the composite image data generated by the photographed image composing/displaying program, the composite image data deformed by the still image deforming program, and etc. are temporarily stored in this area.

The still image copy data storing area 92 is an area for temporarily storing the same copied data as the image data of the photographed still image. Because of the copied data, even after the above-described image data of the still image is composed with the region image, and the composite image is deformed, the composite image can be returned to its pre-composition state by copying and transferring the copied data to the still image data storing area 90, or directly displaying it on the LCD 18. In addition, by performing a composition using the copied data, a composite image obtained by further deforming the region image can be generated.

The extracted image data storing area 94 is an area for extracting and storing the image data of a region of a face (for example, eyes, mouth, and etc.) to be utilized for composing and changing an image from the image data of the still image by the region image extracting program, and includes an right eye region image data storing area 94a, a left eye region image data storing area 94b, and a mouth region image data storing area 94c, and etc.

The right eye region image data storing area 94a is an area storing a part matching with a displayed position of the right eye index 102a, extracted from the image data of the still image, that is, an image of the range surrounded by the right eye index 102a formed in the rectangular shape in this embodiment. Accordingly, in a case that the operator 100 takes a picture by adjusting a position of the game apparatus 10 such that the right eye of the object is included in the right eye index 102a, the image including the right eye and its surrounding face is stored as the right eye region image.

Similarly, the left eye region image data storing area 94b is an area storing, as the left eye region image, a part matching with a displayed position of the left eye index 102b, that is, an image including the left eye and its surrounding face, which is obtained by extraction. Furthermore, the mouth region image data storing area 94c is an area storing, as the mouth region image, a part matching with a displayed position of the mouth index 102c, that is, an image including the mouth and its surrounding face, which is obtained by extraction.

The sound data storing area 96 stores sound data output as necessary, according to an operation input from the operating switch 20, the photographed data, and etc. For example, when the tearful face changing program is selected, sound data such as "it is dark", etc. is stored in advance so as to be able to output a sound such as "it is dark", etc.

In the game apparatus 10, by use of the above-described camera cartridge 14, it is possible to photograph the object, similar to using an electronic camera or a digital camera.

Referring to FIG. 4, when taking a picture using the game apparatus 10, the operator 100 holds the game apparatus 10 and directs the imaging unit 30 provided in the camera cartridge 14 toward the object (operator 100 herself in FIG. 4). An image of a face of an object captured from the imaging unit 30 is displayed in real time on the photographed image displaying area of the LCD 18. In the FIG. 4 example, the photographed image displaying area is set to an entire screen of the LCD 18. Upon photographing, the imaging index 102 (right eye index 102a, left eye index 102b, and mouth index 102c) is displayed at a predetermined position of the LCD 18 in this embodiment, and this allows the operator 100 to adjust the position of the game apparatus 10 such that the right eye, the left eye, and the mouth of the object displayed on the LCD 18 are respectively coincident with the displayed positions of the right eye index 102a, the left eye index 102b, and the mouth index 102c. Then, by performing a shutter operation by depressing the L button 20d, the photographed image data is stored in the WRAM 36 as the still image data, and the still image is displayed on the LCD 18.

Figure 5:
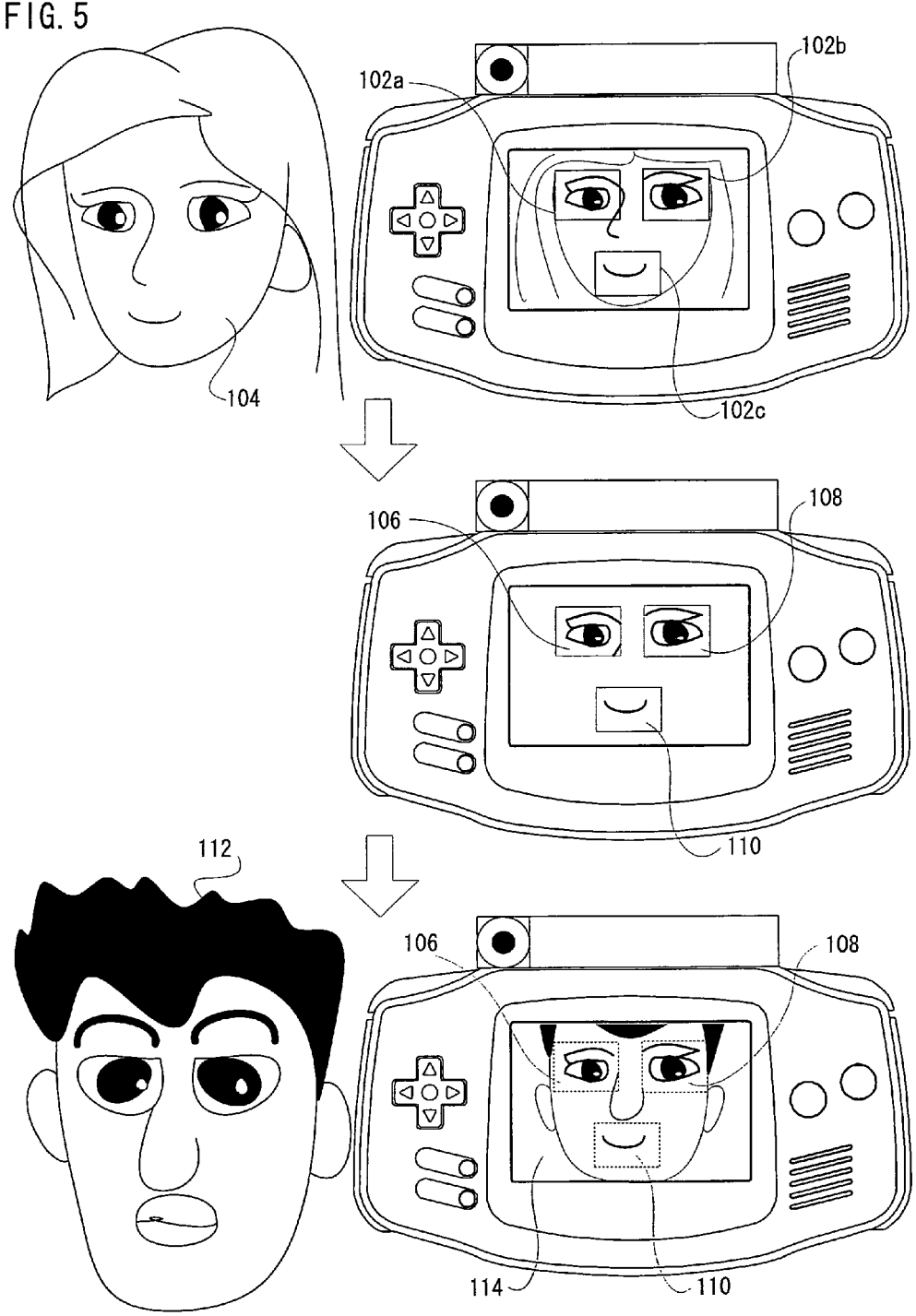
FIG. 5 is an illustrative view showing an overview when forming a composite image utilizing the image processing apparatus of FIG. 1 embodiment.

Then, in the game apparatus 10, images of faces of persons are photographed one after another, an image of a predetermined region of the face extracted from one image is superposed on another image, and thus, the composite image can be displayed on the LCD 18. Upon photographing for such the composite image, a plurality of objects (two of 104 and 112 in this embodiment) are photographed one after another as shown in FIG. 5. First, as shown in the upper row of FIG. 5, one object 104 is photographed. When the operator 100 photographs such that each of the right eye index 102a, the left eye index 120b, and the mouth index 102c is coincident with each of the regions of the face as described above, each of image data of the region matching with the displayed position of each of the photographing indexes 102 is extracted from the photographed data, and stored in the extracted image data storing area 94 as the region image data (right eye region image data, left eye region image data and mouth region image data). Then, as shown in the middle row of FIG. 5, a right eye region image 106, a left eye region image 108, and a mouth region image 110 that are extracted are displayed at predetermined positions of the LCD 18.

Then, the operator 100 takes a picture of other object 112. At a time of taking a picture of the other object, an image captured from the imaging unit 30 is displayed in real time at an area except for the displayed areas of the respective region images 106, 108, and 110 on the LCD 18. Accordingly, as shown in the lower row of FIG. 5, the operator 100 adjusts a photographing position such that the right eye, the left eye and the mouth of the object 112 are respectively coincident with and hidden behind the displayed positions of the region images 106, 108, and 110 on the LCD 18, and whereby it is possible to photograph an image 114 of a presentable face when forming a composite image. In response to a shutter operation by the operator 100, photographed data from the imaging unit 30 at that time is stored in the WRAM 36 as still image data. Then, the still image 114 and the region images 106, 108, and 110 are composed to display the composite image on the LCD 18. In the composite image, the region images 106, 108, and 110 extracted by photographing the one object 104 are utilized as parts of the right eye, the left eye, and the mouth, and the image 114 obtained by photographing the other object 112 is utilized to the rest part thereof.

It is noted that in the lower line of FIG. 5, in order to clearly show the region image, the respective region images 106, 108 and 110 are bordered with a rectangular frame in a dotted line. However, such bordering is not actually displayed on the LCD 18.

Thus, the operator 100 and the objects 104 and 112 not only view images individually photographed, but also enjoy viewing an interesting composite image in which the images of the predetermined regions of the one face are pasted on the other face, obtained by composing the plurality of photographed images.

In addition, in this embodiment, when the predetermined condition is satisfied, various changes are added to the region images corresponding to the condition with respect to the composite image. Thus, the interest of the composite image is further enhanced. For example, the luminance data is extracted as the feature data from the photographed data of the imaging unit 30, and the still image deforming program corresponding to the value is selected and activated. Furthermore, in a case that a predetermined time elapses without any operation input from the operating switch 20 after photographing and displaying a composite image, a corresponding still image deforming program is activated, for example. More specifically, FIG. 6 shows the way that the image deformation is performed on the composite image.

FIG. 6(A) shows a case in which the luminance data extracted as feature data from the photographed data obtained from the imaging unit 30 is a standard luminance state. In the case of the standard luminance, the right eye region image 116, the left eye region image 118, and the mouth region image 120 remain as photographed and are not subjected to change.

It is noted that in FIG. 6, in order to diagrammatically show the way the respective region images are changed, the respective region images are bordered by frames in a dotted line. However, such bordering is not actually displayed on the LCD 18.

FIG. 6(B) shows a case that the feature data is a low luminance state such as rainy weather. In the case of the low luminance, it is determined by the still image deforming condition comparing program that the tearful face changing program selecting data in the still image deforming table is applicable, and the tearful face changing program is selected. Thus, the right eye region image 116, the left eye region image 118, and the mouth region image 120 are respectively rotated in the counterclockwise direction, rotated in the clockwise direction, and compressed (reduced) up and down. Then, the deformed right eye region image 122, left eye region image 124 and mouth region image 126 of one person are composed with the still image of the other person, and displayed on the LCD 18. Through this deformation, a gloomy face (tearful face) is formed so as to indicate that the luminance is low. Furthermore, if degrees of deformation such as a rotation, compression and etc. are changed depending on the magnitude of luminance data, a considerably low luminance increases an amount of rotation and an amount of compression, and produces a more severely tearful face.

FIG. 6(C) shows a case that the feature data is a high luminance state such as fine weather. In the case of the high luminance, it is determined by the still image deforming condition comparing program that the smiling face changing program selecting data in the still image deforming table is applicable, and the smiling face changing program is selected. Thus, the right eye region image 116, the left eye region image 118, and the mouth region image 120 are respectively rotated in the clockwise direction, rotated in the counterclockwise direction, and enlarged. Then, the deformed right eye region image 128, left eye region image 130 and mouth region image 132 of one person are composed with the still image of the other person, and displayed on the LCD 18. Through this deformation, a cheerful face (smiling face) is formed so as to indicate that the luminance is high.

Furthermore, if a degree of deformation such as a rotation, or a compression is changed depending on the magnitude of the luminance data, a considerably high luminance increases the amount of rotation, the amount of compression, etc., thus producing a more dynamic smiling face.

It is noted that although the deformation is performed on all the extracted region images 106, 108, and 110 in this embodiment, the deformation may be performed on fewer than all the region images. For example, by reducing the region image of one eye, a winking face can be formed.

FIG. 6(D) shows a case in which no operation input is present after a lapse of a predetermined time after photographing. When a predetermined time elapses without an operation, it is determined a sleepy face changing program selecting data in the still image deforming table is applicable, and the sleepy face changing program is selected. Thus, the right eye region image 116, the left eye region image 118, and the mouth region image 120 are respectively compressed up and down, compressed up and down, and remained as it is or compressed up and down. Then, the deformed right eye region image 134, left eye region image 136 and the deformed or not deformed mouth region image 138 of one person are composed with the still image of the other person, and displayed on the LCD 18. Through this deformation, a sleepy face is formed so as to indicate sleepiness. Furthermore, if the degree of compression is changed depending on the total lapse of time, the amount of change becomes large as the no-operation state continues, thus displaying a sleepier face.

Thus it is possible to enjoy a composite image obtained by displacing the predetermined regions of the face of one person with that of another person. Also, by deforming the region image on the composite image, it is possible to enjoy a composite image with variable facial expressions.

Figure 7:
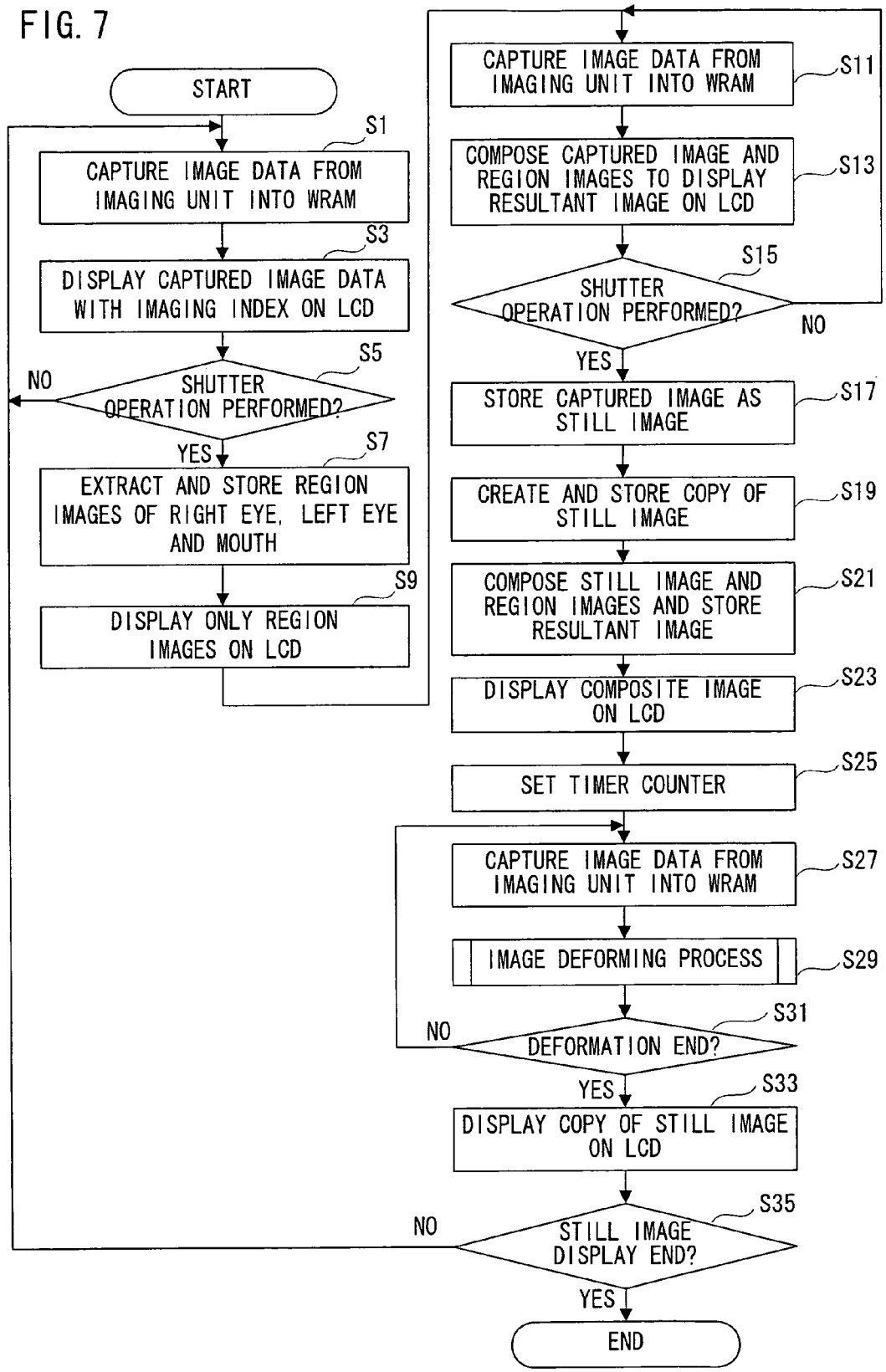
FIG. 7 is a flowchart showing one example of an operation at a time of forming a composite image in the image processing apparatus of FIG. 1 embodiment.

FIG. 7 shows one example of an operation forming a composite image in the game apparatus 10. First, in a step S1, the CPU 32 of the game apparatus 10 captures image data from the imaging unit 30 to the imaging data buffer area 86 of the WRAM 36. Then, in a step S3, the CPU 32 displays the captured image on the LCD 18 via the image processing unit 38. On the LCD 18, the imaging indexes 102 read from the ROM 34 or WRAM 36 are also displayed at the predetermined positions together with the image captured from the imaging unit 30. Then, in a step S5, the CPU 32 determines whether or not a shutter operation input from the operating switch 20 is present. If "NO" in the step S5, that is, if the shutter operation is not performed, the process returns to the step S1 so as to newly capture imaging data from the imaging unit 30. It takes relatively short time for processing the step S1 to the step S5, and therefore, the images are repeatedly captured from the imaging unit 30 and displayed on the LCD 18 while the L button 20*d* is not operated by the operator 100, and this gives an effect as if a photographing is performed in real time. Thus, it is possible for the operator 100 to take a picture while confirming an image displayed on the LCD 18.

On the other hand, if "YES" in the step S5, that is, if the shutter operation input by the operator 100 is present, the CPU 32 extracts image data of parts matching with the displayed positions of the right eye index 102*a*, the left eye index 102*b*, and the mouth index 102*c* from the captured imaging data so as to store them in the extracted image data storing area 94 as the right eye region image, the left eye region image and the mouth region image, respectively, in a step S7. Then, in a step S9, the CPU 32 displays only the region images on the LCD 18, as shown in the middle row of FIG. 5.

Next the CPU 32 captures image data from the imaging unit 30 into the imaging data buffer area 86 of the WRAM 36, in a step S11, and displays the captured image and the region images in a composed manner on the LCD 18 in a step S13. Then, the CPU 32 determines whether or not a shutter operation input is present from the operating switch 20 in a step S15. If "NO" in the step S15, the process returns to the step S11, so as to repeatedly perform the processes of the steps S11 and S13, that is, to newly capture imaging data from the imaging unit 30 and display it on the LCD 18 with the region images composed. Thus, as shown in the lower row of FIG. 5, a display is made such that the image photographed in real time is composed with an area except where the right eye region image 106, the left eye region image 108, and the mouth region image 110 are displayed. The operator 100 can take a picture of another image while viewing the image with such region images composed with the main image.

On the other hand, if "YES" in the step S15, that is, if a shutter operation input is present, the CPU 32 stores the image data captured as a still image in a step S17 in the still image data storing area 90. Furthermore, in a step S19, copy data of the still image is created so as to be stored in the still image copy data storing area 92.

Next, in a step S21, the CPU 32 composes the still image stored in the still image data storing area 90 and the region images stored in the extracted image data storing area 94 to generate a composite image, and stores it in the still image data storing area 90. Then, in a step S23, the CPU 32 displays the composite image on the LCD 18. Thus, as shown in the lower row of FIG. 5, the composite image obtained by displacing parts of the predetermined regions (right eye, left eye and mouth in this embodiment) of one image with the region images 106, 108, 110 extracted from another image is displayed on the LCD 18.

Furthermore, in a step S25, the CPU 32 sets a timer counter (not shown). This makes it possible to measure an elapsed time since the still images have been photographed in response to the shutter operation, and then the composite image is displayed, and this is utilized as a condition to perform the above-described sleepy face image deforming process.

Figure 8:
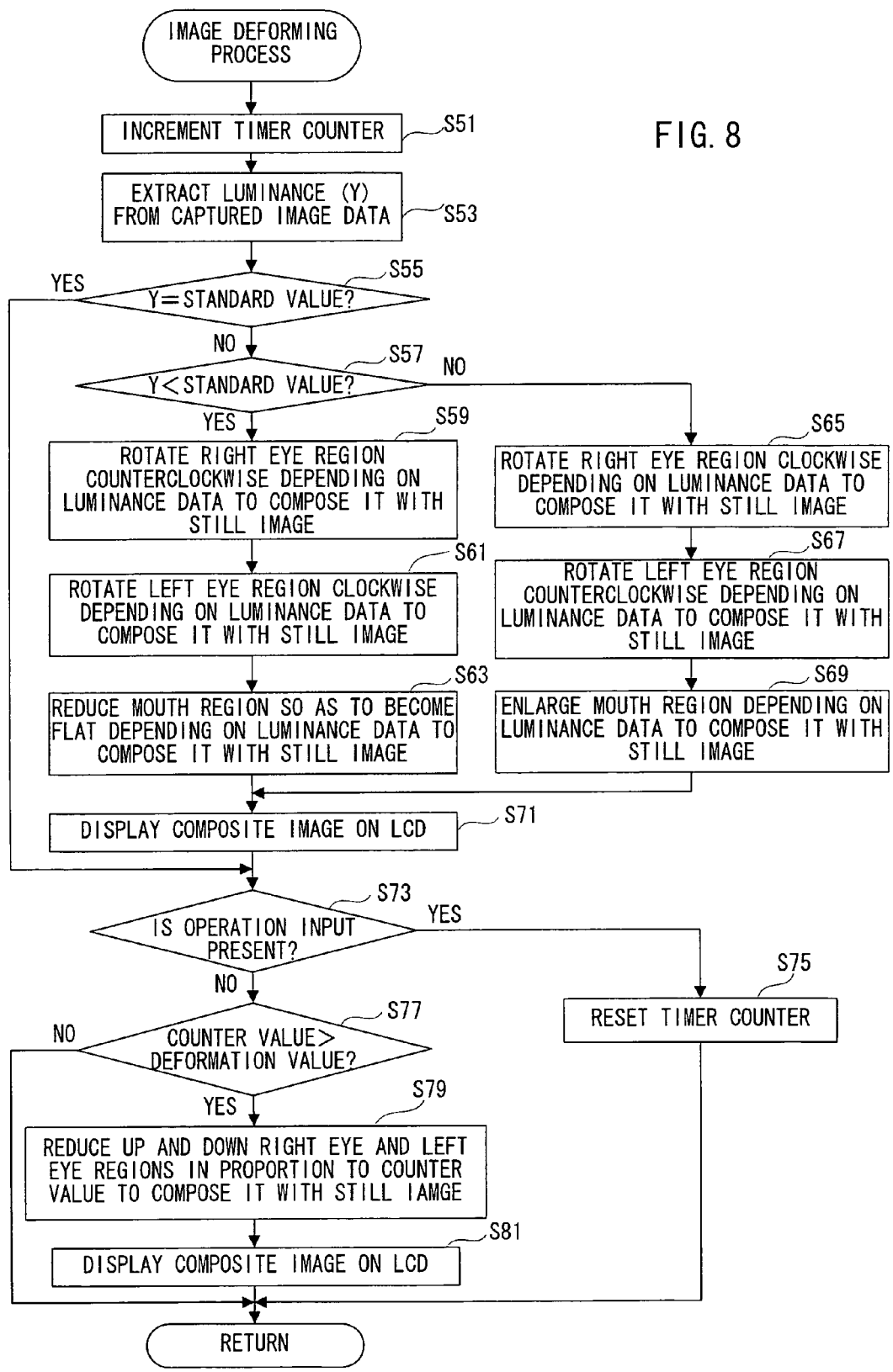
FIG. 8 is a flowchart showing one example of an image deforming process in FIG. 7.

In a step S27, the CPU 32 captures image data from the imaging unit 30 into the imaging data buffer area 86 of the WRAM 36. Then, in a step S29, the CPU 32 executes the image deforming process. Through this process, the composite image is deformed on the basis of the feature data, the elapsed time, and so on, as shown in FIG. 6. The image deforming process in the step S29 is shown in FIG. 8 in detail, and this is described in detail later.

After completion of the step S29, the CPU 32 determines whether or not the image deformation is ended, in a step S31. For example, it is determined whether or not an operation input from the operating switch 20 is present, which would instruct the termination of the image deformation, or it is determined whether or not a predetermined time (time longer than a threshold value for deformation) has elapsed without an operation input. If "NO" in the step S31, the process returns to the step S27 so as to newly capture an image from the imaging unit 30, and in turn to perform the image deforming process in the step S29.

On the other hand, if "YES" in the step S31, the CPU 32 displays the copy of the still image stored in the still image copy data storing area 92, that is, the captured image before being subjected to the deformation or composition on the LCD 18 in a succeeding step S33. At this time also, it may be possible that the still image data originally stored in the still image copy data storing area 92 is not displayed as it is, but that the copy data is further copied to generate another copy data, and the copy data is stored in the still image data storing area 90 so as to be displayed on the LCD 18.

It is noted that the image captured in the step S17 is displayed in the step S33 in this embodiment. However, it may be possible that the initial composite image data created in the step S21 is stored in the still image copy data storing area 92, and the initial pre-deformation composite image is displayed on the LCD 18.

Then, in a step S35, the CPU 32 determines whether or not the display of the still image is done. For example, it is determined whether or not an operation input, for instructing the end of the display of the still image, from the operating switch 20, is present. If "NO" in the step S35, the process returns to the step S1 so as to newly photograph an image to form a composite image. On the other hand, if "YES", the process in the composite image forming process is ended.

FIG. 8 shows one example of an operation in the image deforming process in the step S29 shown in FIG. 7. In a first step S51 shown in FIG. 8, the CPU 32 increments the timer counter set in the step S25 in FIG. 7. Next, in a step S53, the CPU 32 extracts the luminance data (Y data) as the feature data from the image data captured in the step S27 in FIG. 7.

Next, in a step S55, the CPU 32 determines whether or not the Y data is equal to a standard value. If "YES" in the step S55, that is, if the Y data falls within a standard range indicative of the atmosphere not being too dark or light, the process proceeds to a step S73 without performing the image deformation. In this case, as shown in FIG. 6 (A), the composite image, including the region images 116, 118 and 120 that have been extracted, is not deformed and is displayed on the LCD 18.

On the other hand, if "NO" in the step S55, the CPU 32 determines whether or not the Y data is smaller than the standard value in a succeeding step S57. If "YES" in the step S57, that is, if in a dark state, the CPU 32 executes a processing for changing the composite image into the tearful face, in succeeding steps S59 to S63.

That is, in the step S59, the right eye region image data stored in the extracted image data storing area 94 is rotated counterclockwise depending upon the luminance data, and then composed with the still image. It is noted that the still image to be composed is the image captured in response to the shutter operation in the step S17, and the data to be utilized is the data stored in the still image copy data storing area 92 in the step S19. In the step S61, the left eye region image data stored in the extracted image data storing area 94 is rotated clockwise depending upon the luminance data, and then composed with the still image. Furthermore, in the step S63, the mouth region image data is compressed (reduced) up and down so as to be flatter, depending upon the luminance data, and then composed with the still image. Thus, the composite image changed to the tearful face is generated. In a case of a considerably low luminance, for example, the amount of the change is large to generate a more sorrowful face.

On the other hand, if "NO" in the step S57, that is, if the Y data is larger than the standard value, that is, it is in the light state, the CPU 32 executes the process for changing the composite image to the smiling face in following steps S65 to S69.

In the step S65, the right eye region image data stored in the extracted image data storing area 94 is rotated clockwise depending on the luminance data, and then composed with the still image. In the step S67, the left eye region image data is rotated counterclockwise depending on the luminance data, and then composed with the still image. Furthermore, in the step S69, the mouth region image data is enlarged according to the luminance data, and then composed with the still image.

Thus, the composite image changed to the smiling face is generated. For example, in a case of a considerably high luminance, the amount of change is large to generate a more dynamic smiling face.

Then, after generating the deformed composite image, the CPU 32 displays the deformed composite image on the LCD 18 in a step S71. Thus, in a case of the low luminance data, the composite image changed to the tearful face, as shown in FIG. 6(B), is displayed, and in a case of the high luminance data, the composite image changed to the smiling face, as shown in FIG. 6(C), is displayed.

If the step S71 is completed, or if "YES" is determined in the step S55, the CPU 32 determines whether or not any operation input is present from the operating switch 20 in a step S73. If "YES" in the step S73, that is, if the operator 100 operates any one of the operating switches 20, the CPU 32 resets the timer counter in a succeeding step S75, and then ends the image deforming process. Then the process returns to the step S31 shown in FIG. 7.

On the other hand, if "NO" in the step S73, the CPU 32 determines whether or not the value of the counter exceeds a predetermined threshold value (deformation value), to perform the image deformation in a step S77. If "NO" in the step S77, that is, if a predetermined time has not elapsed since the still image was photographed and the initial composite image is displayed, the image deforming process is ended, and then the process returns to the step S31 shown in FIG. 7. Thus, while the image deforming processing is continued without any operation input, the counter is continuously incremented by the step S51, and eventually exceeds the predetermined deformation value.

On the other hand, if "YES" in the step S77, that is, if no operation has been performed by the operator 100 after a lapse of a predetermined time, the CPU 32 compresses (reduces) up and down the right eye region image data and the left eye region image data stored in the extracted image data storing area 94 in proportion to the counter value, and composes them with the still image. Owing to this deformation, the greater the value of the counter is, the tighter the right eye and the left eye are closed, and therefore, it is possible to create a sleepy expression.

Then, in a step S81, the CPU 32 displays the deformed composite image on the LCD 18. Thus, if the predetermined time has elapsed without any operation, the composite image, changed to the sleepy face shown in FIG. 6(D), is displayed. Furthermore, the longer the time is, the more the amount of change is, and this makes it possible to display the composite image of a sleepier face. After completion of the step S81, the image deforming process is completed, and the process returns to the step S31, shown in FIG. 7.

According to this embodiment, when the operator 100 photographs the images of the faces one after another, a composite image, obtained by displacing a predetermined region of one face image with the region image extracted from another face image, can be easily crated and displayed on the spot. Accordingly, it is possible to provide additional fun when taking a picture, and it is possible to provide a more interesting photographic experience than in simply conventionally photographing an object and displaying an individual still image. In addition, there is no need to capture images in the PC and to perform a troublesome composing process, a user can enjoy forming an interesting composite image readily and easily.

Also, because the image data (feature data) input from the imaging unit 30 and the time elapsed without any operation input from the operating switch 20 are repeatedly evaluated while displaying the composite image, if a predetermined condition is satisfied, the region image to be composed with another image is deformed, and therefore the composite image displayed as the still image is continuously changed and displayed.

It is noted that although the regions images 106, 108 and 110 are extracted from the image first photographed, as shown in FIG. 5 in the above-described embodiment, the respective region images may be extracted from the image photographed second. In this case, it may be possible that at a time of second photographing of the image, a part, except for the imaging index 102, is extracted from the image first photographed, and its image is displayed on the LCD 18, or it may be possible that the image first photographed is not displayed, and the imaging index 102 is displayed similar to the first photographing. In such a case, it is possible to easily photograph the image best suitable for creating a composite image.

Furthermore, although in each of the above-described embodiments a predetermined region of the face of the region image extracted by displaying the imaging index 102 is the right eye, the left eye, and the mouth, the regions of the face is not restricted thereto, and may be other regions such as a nose, ears, and so on. Furthermore, these regions may be selected and designated by the operator 100. By setting the regions to be extracted as necessary, it is possible to enjoy a more interesting composite image. In addition, by increasing the number of the regions to be extracted also, it is possible to enjoy forming various interesting composite images. Even if the number of the regions is increased, the player only takes a picture, without performing a troublesome composite process and can form the composite image easily and readily.

In addition, the respective region images are extracted from a single image in each of the above-described embodiments. However, the respective region images are separately extracted from a plurality of images, that is, the composite image may be formed while utilizing the region images that are extracted from a plurality of objects. In this case also, it is possible to form a more interesting composite image.

Furthermore, although the region images are changed only through a rotation and an enlargement/reduction of the eyes and a mouth in each of the above-described embodiments, the region images are changed in another way. That is, by applying the enlargement/reduction to a further part of the region images, the shape of the eyes are changed in the crescent form, and the mouth is changed to turns downward, for example. Therefore, preparing more changing programs of the still image makes it possible to perform a more interesting composite image deformation.

In each of the above-described embodiments, the luminance data is extracted from the optical information of the photographed data as the feature data. However, if it is possible to photograph a color image, a feature can be extracted by use of color information (RGB data), or by temporarily storing a plurality of image data, the feature is extracted from the difference between them. The more such feature data and still image deforming programs prepared as described above, the more image deformations are performed, and the user is capable of a more interesting composite image deformation.

In addition, as shown in FIG. 5, in each of the above described embodiments, by applying an image of a person to the still image 114 which composes the region images, a composite image is generated. However, the still image 114 is not restricted to the image of the face of the person, and other images obtained by photographing various things are possible. In this case, a composite image obtained by pasting predetermined regions of a person on various things can be generated, such as, pasting the eyes and a mouth of the person on various objects such as a paper cup, a book, etc., various structures such as a building, a house, etc., various natural features such as a mountain, a cloud, etc., and composite images which are novel and interesting can be formed.

As one example of the image processing apparatus 10, the game apparatus including the hand-held type game machine 12 and the camera cartridge 14 is shown in each of the above-described embodiments. However, the form of the image processing apparatus is changeable as necessary, and may be applied to a cellular phone with camera, a personal digital assistant with camera, an electronic camera, or the like. When the image processing apparatus 10 is connectable with a network such as the Internet or the like, the image processing program and the data may be downloaded to a memory within the apparatus 10 from a server on the network in place of being stored in advance in a ROM, an HDD within the apparatus 10, a connectable external storage medium or the like.

In a case of the cellular phone with camera, for example, a composite image that has been formed is stored in a memory so as to be used and enjoyed as an image of a standby screen. Furthermore, the region images on the standby screen are deformed according to a feature of the photographed data from the camera, a waiting time without any operation input, etc., and thus the standby screen with the composite image can be changed to a more interesting screen.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
an imager which electronically photographs an object;
an image display which displays said object photographed by said imager;
an imaging guide displaying mechanism which displays on said image display an imaging guide indicative of a position of a predetermined region of a face;
an operating mechanism which inputs data in response to an operation by an operator, or obtains an operation input;
an extracting mechanism which extracts a portion, matching with a display position of said imaging guide, from one image obtained by said imager in response to the operation input from said operating mechanism, and stores it as a region image;
still image storage locations which store another image obtained by said imager as a still image in response to the operation input from said operating mechanism;
a composing mechanism which composes said region image stored by said extracting mechanism and said still image stored at said still image storage locations; and
a composite image display mechanism which displays on said image display a composite image composed by said composing mechanism.

2. An image processing apparatus according to claim 1, further comprising:
a first evaluator which extracts feature data, indicative of a feature of relevant image, from image data obtained by said imager, and evaluates the feature data; and
a first deforming mechanism which deforms said region image according to a result of the evaluation by said first evaluator, wherein
said composing mechanism, when said region image is deformed by said first deforming mechanism, composes said deformed region image and said still image.

3. An image processing apparatus according to claim 1, further comprising:
an elapsed time counter which counts an amount of elapsed time since the operation input from said operating mechanism was present;
an evaluating mechanism for evaluating said elapsed time counted by said elapsed time counter; and
a deforming mechanism for deforming said region image according to a result of the evaluation by said evaluating mechanism; wherein
said composing mechanism, when said region image is deformed by said deforming mechanism, composes said deformed region image and said still image.

4. A computer readable storage medium storing an image processing program for composing and displaying a photographed image in an image processing apparatus provided with an imager which electronically photographs an object, an image display which displays the object photographed by said imager, and an operating mechanism which inputs data in response to an operation by an operator or obtains an operation input, wherein
said image processing program causes a processor of said image processing apparatus to execute the steps of:
an imaging guide displaying step of displaying on said image display an imaging guide indicative of a position of a predetermined region of a face;
an extracting step of extracting a portion matching with a display position of said imaging guide from one image obtained by said imager in response to the operation input from said operating mechanism, and storing it as a region image;
a still image storing step of storing, as a still image, another image obtained by said imager in response to the operation input from said operating mechanism;
a composing step of composing said region image stored by said extracting step and said still image stored by said still image storing step; and
a composite image displaying step of displaying on said image display a composite image composed by said composing step.

5. A computer readable storage medium storing an image processing program according to claim 4, further including following steps of:
a first evaluating step of extracting feature data indicative of a feature of relevant image, from the image data obtained by said imager, and evaluating said feature data; and
a first deforming step of deforming said region image according to a result of the evaluation of said feature data by said first extracting and evaluating step, wherein
said composing step, when said region image is deformed by said first deforming step, composes said deformed region image and said still image.

6. A computer readable storage medium storing an image processing program according to claim 4, further including the steps of:
an elapsed time counting step of counting an amount of elapsed time since the operation input from said operating mechanism was present;
an evaluating step of evaluating said amount of elapsed time counted by said elapsed time counting step; and
a deforming step of deforming said region image according to a result of the evaluation of said amount of elapsed time by said evaluating step; wherein
said composing step, when said region image is deformed by said deforming step, composes said deformed region image and said still image.

7. An image processing apparatus, comprising:

an imager which electronically photographs an object;

an image display which displays the object photographed by said imager;

an imaging guide display which displays on said image display imaging guides representative of positions of regions of a face such that they surround at least both eyes and mouth of said face;

an operating mechanism which performs an input operation by an operator;

an extracting mechanism which extracts the images of the regions of at least both eyes and mouth surrounded by said imaging guides from a first image first obtained in response to said operating mechanism, and stores them as region images;

still image storage locations which store, as a still image, a second image obtained successive to the first image in response to said operating mechanism;

a composing mechanism for composing said region image stored by said extracting mechanism and said still image stored at said still image storage locations;

a composite image display mechanism which displays on said image display a composite image composed by said composing mechanism;

an evaluating mechanism which extracts feature data of the photographed image from optical information of the photographed image obtained by said imager, and evaluates said feature data; and a deforming mechanism which deforms said region image according to said evaluating mechanism, wherein said composing mechanism, when said region image is deformed according to said deforming mechanism, composes said deformed region image and said still image, and displays it on said image display.

8. An image processing apparatus, comprising:

a camera which electronically photographs an object;

an image display which displays said object photographed by said camera;

imaging guide displaying programmed logic circuitry which displays on said image display an imaging guide indicative of a position of a predetermined region of a face;

operating programmed logic circuitry which inputs data in response to an operation by an operator, or obtains an operation input;

extracting programmed logic circuitry which extracts a portion, matching with a display position of said imaging guide, from one image obtained by said camera in response to the operation input from said operating programmed logic circuitry, and stores it as a region image;

still image storage locations which store another image obtained by said camera as a still image in response to the operation input from said operating programmed logic circuitry;

composing programmed logic circuitry which composes said region image stored by said extracting programmed logic circuitry and said still image stored at said still image storage locations; and composite image display programmed logic circuitry which displays on said image display a composite image composed by said composing programmed logic circuitry.

9. An image processing apparatus according to claim 8, further comprising:

evaluating programmed logic circuitry which extracts feature data, indicative of a feature of relevant image, from image data obtained by said camera, and evaluates the feature data; and deforming programmed logic circuitry which deforms said region image according to a result of the evaluation by said evaluating programmed logic circuitry, wherein said composing programmed logic circuitry, when said region image is deformed by said deforming programmed logic circuitry, composes said deformed region image and said still image.

10. An image processing apparatus according to claim 8, further comprising:

an elapsed time counter which counts an amount of elapsed time since the operation input from said operating programmed logic circuitry was present;

evaluating programmed logic circuitry for evaluating said elapsed time counted by said elapsed time counter; and deforming programmed logic circuitry for deforming said region image according to a result of the evaluation by said evaluating programmed logic circuitry; wherein said composing programmed logic circuitry, when said region image is deformed by said deforming programmed logic circuitry, composes said deformed region image and said still image.

11. A computer implemented method of processing a photographed image in an image processing apparatus provided with a camera which electronically photographs an object, an image display which displays the object photographed by said camera, and an operating programmed logic circuitry which inputs data in response to an operation by an operator or obtains an operation input, the method comprising:

displaying on said image display an imaging guide indicative of a position of a predetermined region of a face;

extracting a portion matching with a display position of said imaging guide from one image obtained by said camera in response to the operation input from said operating programmed logic circuitry, and storing it as a region image;

storing, as a still image, another image obtained by said camera in response to the operation input from said operating programmed logic circuitry;

composing said region image stored by said extracting and said still image stored by said still image storing; and displaying on said image display a composite image composed by said composing.

12. A computer-implemented method according to claim 11, further comprising:

extracting feature data indicative of a feature of relevant image, from the image data obtained by said camera, and evaluating said feature data; and deforming said region image according to a result of the evaluation of said feature data by said extracting and evaluating;

wherein said composing, when said region image is deformed by said deforming, composes said deformed region image and said still image.

13. A computer-implemented method according to claim 11, further comprising:

counting an amount of elapsed time since the operation input from said operating programmed logic circuitry was present;

evaluating said amount of elapsed time counted by said elapsed time counting; and deforming said region image according to a result of the evaluation of said amount of elapsed time by said evaluating said amount of elapsed time; wherein said composing, when said region image is deformed by said deforming, composes said deformed region image and said still image.

14. An image processing apparatus, comprising:

a camera which electronically photographs an object;

an image display which displays the object photographed by said camera;

an imaging guide display which displays on said image display imaging guides representative of positions of regions of a face such that they surround at least both eyes and mouth of said face;

operating programmed logic circuitry which performs an input operation by an operator;

extracting programmed logic circuitry which extracts the images of the regions of at least both eyes and mouth surrounded by said imaging guides from a first image first obtained in response to said operating programmed logic circuitry, and stores them as region images;

still image storage locations which store, as a still image, a second image obtained successive to the first image in response to said operating programmed logic circuitry;

composing programmed logic circuitry for composing said region image stored by said extracting programmed logic circuitry and said still image stored at said still image storage locations;

composite image display programmed logic circuitry which displays on said image display a composite image composed by said composing programmed logic circuitry;

evaluating programmed logic circuitry which extracts feature data of the photographed image from optical information of the photographed image obtained by said camera, and evaluates said feature data; and deforming programmed logic circuitry which deforms said region image according to said evaluating programmed logic circuitry, wherein said composing programmed logic circuitry, when said region image is deformed according to said deforming programmed logic circuitry, composes said deformed region image and said still image, and displays it on said image display.

* * * * *